July 11, 1967
F. R. BRADBURY ETAL
3,330,833
PROCESS FOR THE PRODUCTION OF A METAL PYRIDINE
INTERACTION PRODUCT
Filed Nov. 19, 1962
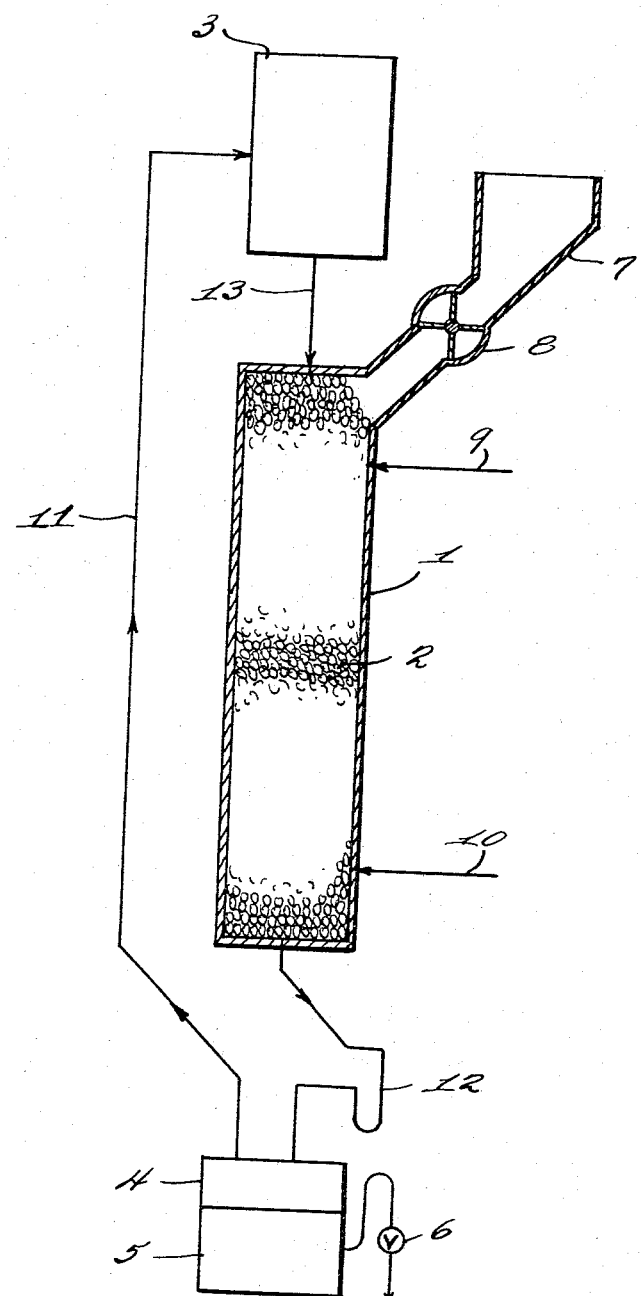
INVENTORS
FRANK RAYMOND BRADBURY
ALASTAIR CAMPBELL
BY
ATTORNEYS 3,330,833
PROCESS FOR THE PRODUCTION OF A METAL PYRIDINE INTERACTION PRODUCT
Frank Raymond Bradbury and Alastair Campbell, Widnes, England, assignors to Imperial Chemical Industries Limited, London, England, a corporation of Great Britain
Filed Nov. 19, 1962, Ser. No. 238,426
Claims priority, application Great Britain, Nov. 23, 1961, 41,933/61
7 Claims. (Cl. 260—270)

This invention relates to the manufacture of organic bases, more particularly bipyridyls, which are of value as intermediates in the manufacture of herbicidal materials.

In co-pending application Ser. No. 193,627 filed May 9, 1962, now U.S. Patent No. 3,210,360 there is described a process for the manufacture of bipyridyls which comprises interacting a pyridine and magnesium, and oxidizing the pyridine-magnesium interaction product so formed. In co-pending application, Ser. No. 221,899, filed Sept. 6, 1962, now U.S. Patent No. 3,210,362 there is described a similar process for making bipyridyls, which comprises interacting a pyridine and aluminum and oxidizing the pyridine-aluminum interaction product so formed.

Also, in co-pending application Ser. No. 208,566 filed July 9, 1962, there is described an improvement in the said process which comprises using an N:N-dialkylarylamine, for instance N:N-dimethylaniline, as diluent during the metal-pyridine interaction. These diluents have a higher boiling point than the pyridine.

In these processes, the magnesium and aluminum metals do not always react readily, and it is usually necessary to add a reaction initiator in order to achieve satisfactory results, and also to use the metals in a form having as large a surface as possible, for example powder, turnings, or the like. Once reaction has started, there is also a tendency for the interaction product to separate out in the solid state and to impede further reaction. These circumstances make it difficult to carry out the process in a continuous manner, so that batch processes are generally found to be more convenient for large scale operation.

We have now found that the continuous (as distinct from batchwise) interaction of a pyridine with a metal can be greatly facilitated by supplying the pyridine to a reaction vessel in which it is percolated through a body of particles of the metal and withdrawing from the reaction vessel a fluid reaction mixture containing the metal-pyridine interaction product.

The process is applicable to any metal which can interact with the pyridine without undue vigor, but is especially applicable to magnesium or aluminum. Of these two metals, magnesium is the more active. Likewise, the process is especially applicable to pyridine itself, but can also be applicable to pyridines containing hydrocarbon substituents (for example lower alkyl pyridine derivatives such as picolines and lutidines) though these are usually less reactive than pyridine itself. The pyridine used should be as free as possible from any substituents or impurities (for example piperidine) which can take part in any undesirable side reaction with the metal (or with the initiator, when one is used), and is preferably dry.

Magnesium and aluminum are most reactive when in finely divided form, for example powder or turnings, but may also be used in more massive form if desired. In the present process, it is found that very finely divided metal can impede the flow of fluid through the reaction vessel, and it is accordingly preferable to use the metal in a sufficiently coarse form to allow adequate percolation of fluid through the excess metal. In order to facilitate reaction, it is preferred that the particle size of the metal should be as small as possible consistent with its retention in the reactor vessel. In general, turnings are the form to be preferred for best results.

To assist percolation, the contents of the reaction vessel may be agitated, for example by a stirrer. This can help to reduce blockage of the spaces between the metal particles by the interaction product. To minimize the entraining of unreacted metal particles in the fluid reaction product drawn off from the reaction vessel, it is preferred that only part of the contents of the vessel are agitated and that, in a zone adjacent to the point at which the reaction product is drawn off, the contents are maintained in a relatively quiescent state.

As interaction of the metal and the pyridine is slow to start, the addition of a reaction initiator is practically essential in the initial stages of operation, but can usually be reduced or discontinued when steady reaction conditions have been established in the reaction vessel. In most instances, however, the inflow of fresh pyridine may tend to quench the interaction, especially when the pyridine entering the reaction vessel contacts metal which has not already reached a state of high reactivity. Accordingly, we prefer that additions of reaction initiator are made to the pyridine supply in order to sustain the metal-pyridine interaction. These additions may be continuous or periodic, and the proportions to be added may be determined best by simple trial, as they will depend largely upon the particularly apparatus and materials employed. If desired, the additions of initiator may be made directly to the reaction vessel.

Suitable reaction initiators include materials which can induce the formation of free radicals in the metal-pyridine mixture, and in particular an alkali metal (for example a dispersion of sodium or potassium in an inert diluent such as trimethylbenzene or other hydrocarbons) or a halogen (for example bromine or iodine). In the case of aluminum, initiators also include materials capable of breaking down the oxide film on the metal surface, particularly mercury compounds for example mercuric chloride. These initiators are discussed more fully in co-pending applications, Ser. Nos. 193,627 and 221,899.

The metal in the reaction vessel is usually present in proportions which are much in excess of those needed for reaction with the pyridine, but the exact amount is not critical for the purposes of continuous operation as the rate of reaction is not very great. The metal is replenished by addition of further quantities at suitable intervals, as the metal in the reaction vessel is dissolved.

Since the pyridine does not react completely with the metal, the fluid reaction mixture withdrawn from the vessel will contain a considerable proportion of unreacted pyridine which, for economic reasons, is conveniently recovered and returned to the reaction vessel. Such recovery can conveniently be made by distillation techniques, most conveniently after the conversion of the dissolved interaction product to bipyridyls by oxidation. If the recovered pyridine is wet, it should be dried before recycle.

Solution of the metal-pyridine interaction product can be facilitated, and an economy effected in the amounts of pyridine employed, by supplying also an N:N-dialkylarylamine to the reaction vessel. This acts as a solvent diluent, and assists in the removal of the interaction product from the reaction vessel. Dimethylaniline is a particularly suitable diluent. Such a diluent, which has a boiling point above that of pyridine, also has the advantage of enabling a high reaction temperature and a consequently improved rate of reaction to be maintained.

In a simple form of the process, a supply of pyridine (and optionally also a diluent, for instance dimethylaniline) is fed into a reaction vessel filled with metal particles, e.g. magnesium or aluminum and maintained at a temperature conducive to reaction, particularly at a temperature about 90° C. It is also apparent from copending applications, Ser. No. 193,627 and Ser. No. 221,899, that temperatures above 60° C. and temperatures ranging up to about 120° C. or approximately the boiling point of the reaction mixture may sometimes desirably be employed for the present process. This mixture is allowed to percolate through the metal, whether upwardly or downwardly and by the effects of gravity, hydrostatic pressure or any other convenient means. Some of the metal interacts with the pyridine and the interaction product dissolves, and the resulting fluid mixture is withdrawn from the vessel.

It is especially convenient to make the reaction vessel in the form of a column which can be filled with metal particles, and up or down which the pyridine is percolated. The percolating pyridine is preferably hot, and may optionally contain a proportion of solvent diluent and reaction initiator as already described. This form of apparatus also has the advantage of allowing the pyridine to be concentrated to a considerable extent in the reaction zone in the reaction vessel, especially when the diluent addition is made directly to the boiler.

One embodiment of the invention utilizes an apparatus which consists of reaction vessel connected at its lower end to a boiler and at its upper end to a reflux condenser. By boiling pyridine, with or without a diluent, in the boiler it is then possible for the mass of metal in the reaction vessel to be maintained at a temperature approximating to the boiling point of the pyridine or pyridine-diluent mixture, while maintaining a steady flow of pyridine from the reflux condenser passing through the mass of metal, e.g. magnesium, and back into the boiler. The boiler is provided with a suitable overflow device which allows a proportion of the fluid contents of the boiler to be withdrawn for use of the interaction product, particularly for oxidation to bipyridyls. The reaction vessel should also be provided with inlet means for supplying sufficient pyridine and metal to replace that consumed, any initiator which is required, and sufficient pyridine and diluent to replace that withdrawn from the boiler. Conveniently, the inlet for metal may be near the top of the reaction vessel, and that for the liquid materials may be near the pyridine inlet or at a position intermediate between this and the outlet of the vessel.

An apparatus which is useful for carrying out the process of the present invention is represented diagrammatically in the drawing, wherein the column 1 serves as reaction vessel and contains metal fragments or pieces 2. At the lower end of the column, a boiler 4 containing the pyridine or pyridine/diluent mixture 5 provides an upward stream of vapors to a condenser 3 via vapor line 11 and receives from the column via liquid return line 12 the fluid mixture containing dissolved metal-pyridine interaction product. At the upper end of the column, the condenser 3 receives vapors from the boiler 4 via vapor line 11 and returns condensed pyridine to the top of the column via line 13. When an initiator is to be added, it can conveniently be added via line 13. A run-off device 6 enables part of the contents of the boiler to be run off, continuously or intermittently, for further treatment. A hopper 7 and seal or star-feed valve 8 at the upper end of the column 1 enable further additions of metal to be made to the column as necessary, an inlet pipe 9 serves as a means of supplying pyridine to the system, and a further inlet pipe 10 serves as a means for supplying additional diluent to the system.

In use, the pyridine is vaporized in the boiler 4, is condensed in condenser 3, reacts in part with the metal 2 in column 1, and the resulting fluid reaction product is returned to the boiler 4. Unused pyridine is recycled, and the metal-pyridine reaction product accumulates in the boiler and a proportion of this is run off, periodically or steadily, for use.

The fluid reaction mixture containing the metal-pyridine interaction product, which is withdrawn from the reaction vessel, may be used for the manufacture of bipyridyls by known techniques, more particularly by oxidation. Suitable methods of oxidation which may be used include oxidation by blowing through the mixture a stream of oxygen, air or chlorine, optionally diluted with nitrogen or other inert gas, or by adding a hypochlorite such as sodium hypochlorite, nitric acid, a nitrate of a weak organic base for instance pyridine, a water-soluble inorganic peroxy compound such as hydrogen peroxide, or an organic nitro compound.

The isolation of bipyridyls from the oxidation product may also be carried out using known techniques. The unchanged pyridine and any diluent employed may also be recovered, dried and returned to the reaction vessel for re-use.

The magnesium and aluminum used in the process of this invention may be the substantially pure metals or alloys thereof with each other. Minor amounts of alloying constituents other than magnesium or aluminum can also be present. Such other constituents may, if present in considerable proportion, remain undissolved when the magnesium or aluminum dissolve away and consequently accumulate in various parts of the apparatus so that periodical clearance may be necessary.

What we claim is:

1. A process for the continuous production of a metal-pyridine interaction product which comprises reacting a compound selected from the group consisting of pyridine and lower alkyl derivatives thereof with a reactive metal selected from the group consisting of magnesium, aluminum and alloys thereof by continuously percolating said compound through a body of said reactive metal in particle form, agitating said compound and metal particles during the reaction to assist the percolating and reduce blockage between said metal particles, and recovering a fluid reaction product containing said metal-pyridine interaction product.

2. Process as claimed in claim 1 wherein the metal is aluminum.

3. Process as claimed in claim 1 wherein the metal is magnesium.

4. Process as claimed in claim 1 wherein the metal particles are in the form of turnings.

5. Process as claimed in claim 1 wherein the metal particles in the reaction mixture are maintained at about 90° C.

6. Process as claimed in claim 1 wherein the compound is pyridine.

7. The metal-pyridine containing fluid reaction product of claim 1.

References Cited

UNITED STATES PATENTS

| | | | |
|---|---|---|---|
| 505,816 | 10/1893 | Cochran | 23—272.6 |
| 1,942,848 | 1/1934 | Taylor et al. | 23—272.6 |
| 2,053,518 | 9/1936 | Crittenden | 23—283 |

OTHER REFERENCES

Badger et al.: J. Chem. Soc., pp. 616–20 (1956).
Emmert: Ber. deut. Chem. vol. 49, pp.1060–2 (1916).
Setton: Compt. Rend., vol 224, pp. 1205–7 (1957).

ALEX MAZEL, *Primary Examiner.*

NICHOLS S. RIZZO, HENRY R. JILES, *Examiners.*

D. M. KERR, DONALD G. DAUS, *Assistant Examiners.*